US012444312B2

(12) United States Patent
van Tulder

(10) Patent No.: US 12,444,312 B2
(45) Date of Patent: Oct. 14, 2025

(54) MESSAGE ARBITRATOR FOR AIRCRAFT TRAJECTORY MANAGEMENT

(71) Applicant: The Boeing Company, Arlington, VA (US)

(72) Inventor: Paul A. van Tulder, Burien, WA (US)

(73) Assignee: The Boeing Company, Arlington, VA (US)

( * ) Notice: Subject to any disclaimer, the term of this patent is extended or adjusted under 35 U.S.C. 154(b) by 317 days.

(21) Appl. No.: 18/183,906

(22) Filed: Mar. 14, 2023

(65) Prior Publication Data

US 2024/0312351 A1 Sep. 19, 2024

(51) Int. Cl.
*G08G 5/50* (2025.01)
*G08G 5/34* (2025.01)
*G08G 5/55* (2025.01)

(52) U.S. Cl.
CPC .............. *G08G 5/50* (2025.01); *G08G 5/34* (2025.01); *G08G 5/55* (2025.01)

(58) Field of Classification Search
None
See application file for complete search history.

(56) References Cited

U.S. PATENT DOCUMENTS

| 2008/0288164 A1* | 11/2008 | Lewis | G08G 5/34 701/120 |
| 2011/0246053 A1* | 10/2011 | Coulmeau | G08G 5/34 701/120 |
| 2012/0158219 A1* | 6/2012 | Durling | G08G 5/26 701/4 |
| 2012/0215435 A1* | 8/2012 | Subbu | G08G 5/727 701/120 |
| 2012/0245834 A1* | 9/2012 | Klooster | G08G 5/32 701/120 |
| 2018/0261104 A1* | 9/2018 | Jonak | G08G 5/76 |
| 2020/0242947 A1* | 7/2020 | Ayhan | H04L 67/12 |
| 2020/0407075 A1* | 12/2020 | Toews | G08G 5/53 |

FOREIGN PATENT DOCUMENTS

| CA | 2768323 A1 * | 8/2012 | ........... G08G 5/0013 |
| EP | 3690862 A1 | 8/2020 | |

OTHER PUBLICATIONS

N. Sandhu, D. Liang and F. M. Prott, "4DT Live Flight Demonstrations-Paving the Way to a Better CDM Environment," 2019 Integrated Communications, Navigation and Surveillance Conference (ICNS), Herndon, VA, USA, 2019, pp. 1-8, doi: 10.1109/ICNSURV.2019.8735326. (Year: 2019).*

(Continued)

*Primary Examiner* — Aniss Chad
*Assistant Examiner* — Jennifer M Anda
(74) *Attorney, Agent, or Firm* — Yee & Associates, P.C.

(57) ABSTRACT

A method, apparatus, system, and computer program product for managing a trajectory for an aircraft. A computer system receives an agreed trajectory change for a future portion of the trajectory for the aircraft. The strategic trajectory message is approved by a strategic air traffic controller. The computer system determines whether the agreed trajectory change has been received within a strategic time horizon for making strategic changes to the trajectory. The computer system sends the agreed trajectory change for a future portion of the trajectory for the aircraft to an aircraft computer system in the aircraft in response to the agreed trajectory change being received within the strategic time horizon.

26 Claims, 8 Drawing Sheets

(56) References Cited

OTHER PUBLICATIONS

D. Liang, T. Ngo, J. Biel-Goebel, S. Masarky, M. Ellen Miller and I. Fullmer, "Operational & Technical Evaluation of The FF-ICE/Execution Strategic Phase Across Boundaries," 2021 Integrated Communications Navigation and Surveillance Conference (ICNS), Dulles, VA, USA, 2021, pp. 1-12, (Year: 2021).*

D. Liang, K. Cropf, R. Sherwin, G. Porter, S. Masarky and F. Sutton, "Operational Evaluation of FF-ICE/R2," 2019 Integrated Communications, Navigation and Surveillance Conference (ICNS), Herndon, VA, USA, 2019, pp. 1-10, (Year: 2019).*

Cotton William B et al: "Strategic airborne trajectory management", Dec. 1, 2020 (Dec. 1, 2020), XP093180518, Retrieved from the Internet: URL:https://ntrs.nasa.gov/api/citations/20205007619/downloads/NASA-TM-20205007619final.pdf, [retrieved on Jul. 1, 2024].

European Patent Office Extended Search Report, dated Aug. 13, 2024, regarding Application No. EP 24150200.4, 10 pages.

Liang Diana et al: "Operational & Technical Evaluation of The FF-ICE/Execution Strategic Phase Across Boundaries", 2021 Integrated Communications Navigation and Surveillance Conference (ICNS), IEEE, Apr. 19, 2021 (Apr. 19, 2021), pp. 1-12, XP033920540,DOI: 10.1109/ICNS52807.2021.9441642, [retrieved on May 25, 2021].

Liang Diana et al: "Operational Evaluation of FF-ICE/R2", 2019 Integrated Communications, Navigation and Surveillance Conference (ICNS), IEEE, Apr. 9, 2019 (Apr. 9, 2019), pp. 1-10, XP033560952, DOI: 10.1109/ICNSURV.2019.8735320, [retrieved on Jun. 11, 2019].

Sandhu Nabil et al: "4DT Live Flight 1-15 Demonstrations-Paving the Way to a Better CDM Environment", 2019 Integrated Communications, Navigation and Surveillance Conference (ICNS), IEEE, Apr. 9, 2019 (Apr. 9, 2019), pp. 1-8, XP033560951, DOI: 10.1109/ICNSURV.2019.8735326, [retrieved on Jun. 11, 2019].

* cited by examiner

MESSAGE ARBITRATOR FOR AIRCRAFT TRAJECTORY MANAGEMENT

BACKGROUND INFORMATION

1. Field

The present disclosure relates generally to an improved computer system and in particular, to a method, apparatus, system, and computer program product for managing trajectory messages from multiple sources for operating aircraft.

2. Background

In operating aircraft, the current method of communication between an air traffic controller and the flight crew in an aircraft uses a voice radio. This type of communication is slowly being replaced with electronic messages. For example, Controller Pilot Datalink Communication (CPDLC) is one technique for communication between an air traffic controller and the flight crew using a dedicated datalink for air traffic controller (ATC) communications. Communications under CPDLC uses two-way data links that can transmit messages to an aircraft as an alternative to voice communications. The message is displayed on the flight deck and a visual display is provided to the flight crews. In one example, a pilot can respond to these messages to request ATC clearances (i.e., authorizations to proceed through the ATC airspace), receive ATC clearances, and information and to report information.

With the CPDLC standard, a set of ATC clearance message elements, information message elements, and request message elements are exchanged that correspond to well established voice phraseology employed in air traffic control procedures today. This type messaging system involves a human operator at either end of the communications.

Another standard being developed is Flight and Flow Information for Collaborative Environment (FF-ICE) is a standard being developed by the International civil aviation organization (ICAO) as a complementary alternative to voice-based exchanges currently used between aircraft and air traffic controllers. FF-ICE is currently being implemented in Europe for predeparture operations; and ICAO is a worldwide standardization body for both Europe, the United States, and other regions in the world. FF-ICE will include standards for digital message exchanges using System Wide Information Management (SWIM) currently promoted in the United States.

SWIM is a Federal Aviation Administration (FAA) information sharing platform that is designed to increase common situational awareness and a greater sharing of air traffic management (ATM) system information. SWIM can be used to exchange air traffic management system information including trajectory information for aircraft. SWIM can also be used to exchange information such as airport status, weather information, flight data, status of a special use aerospace, national airspace restrictions, and other information or in standards such as FF-ICE.

With the advent of different standards for exchanging information regarding the operation of aircraft, incompatibilities can be present in how information is exchanged. As result, reconciliations are needed between existing standards such as CPDLC and FF-ICE with SWIM overlapping the two. In some cases, multiple computing devices and multiple dedicated networks (e.g., satellite) are needed to exchange information using the different standards depending on the particular location. Further, modifications to current computer systems, networks, and aircraft may be needed to be able to use more than one standard. This type of modification can require recertification and approval, which can take much time and expense.

Therefore, it would be desirable to have a method and apparatus that take into account at least some of the issues discussed above, as well as other possible issues.

SUMMARY

An embodiment of the present disclosure provides a method for managing a trajectory for an aircraft. A computer system receives an agreed trajectory change for a future portion of the trajectory for the aircraft. The strategic trajectory message is approved by a strategic air traffic controller. The computer system determines whether the agreed trajectory change has been received within a strategic time horizon for making strategic changes to the trajectory. The computer system sends the agreed trajectory change for a future portion of the trajectory for the aircraft to an aircraft computer system in the aircraft in response to the agreed trajectory change being received within the strategic time horizon.

Another embodiment of the present disclosure provides an arbitration system comprising a computer system and an arbitrator located in the computer system. The arbitrator is configured to receive an agreed trajectory change for a future portion of the trajectory for the aircraft. The arbitrator is configured to determine whether the agreed trajectory change has been received within a strategic time horizon for making strategic changes to the trajectory. The arbitrator is configured to send the agreed trajectory change for the future portion of the trajectory for the aircraft to an aircraft computer system in the aircraft in response to the agreed trajectory change being received within the strategic time horizon.

Yet another embodiment of the present disclosure provides a method for managing a trajectory of an aircraft. A computer system receives a trajectory revision request from a data processing device. The trajectory revision request is a request to change a future portion of the trajectory for the aircraft. The computer system determines whether the future portion of the trajectory is for a time greater than a time threshold for an aircraft computer system in the aircraft to change the future portion of the trajectory. The aircraft computer system manages the trajectory for the aircraft. The computer system sends the trajectory revision request to the aircraft computer system in the aircraft in response to the future portion of the trajectory being for the time greater than the time threshold. The computer system receives a response to the trajectory revision request from the aircraft computer system in response to sending the trajectory revision request to the aircraft computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
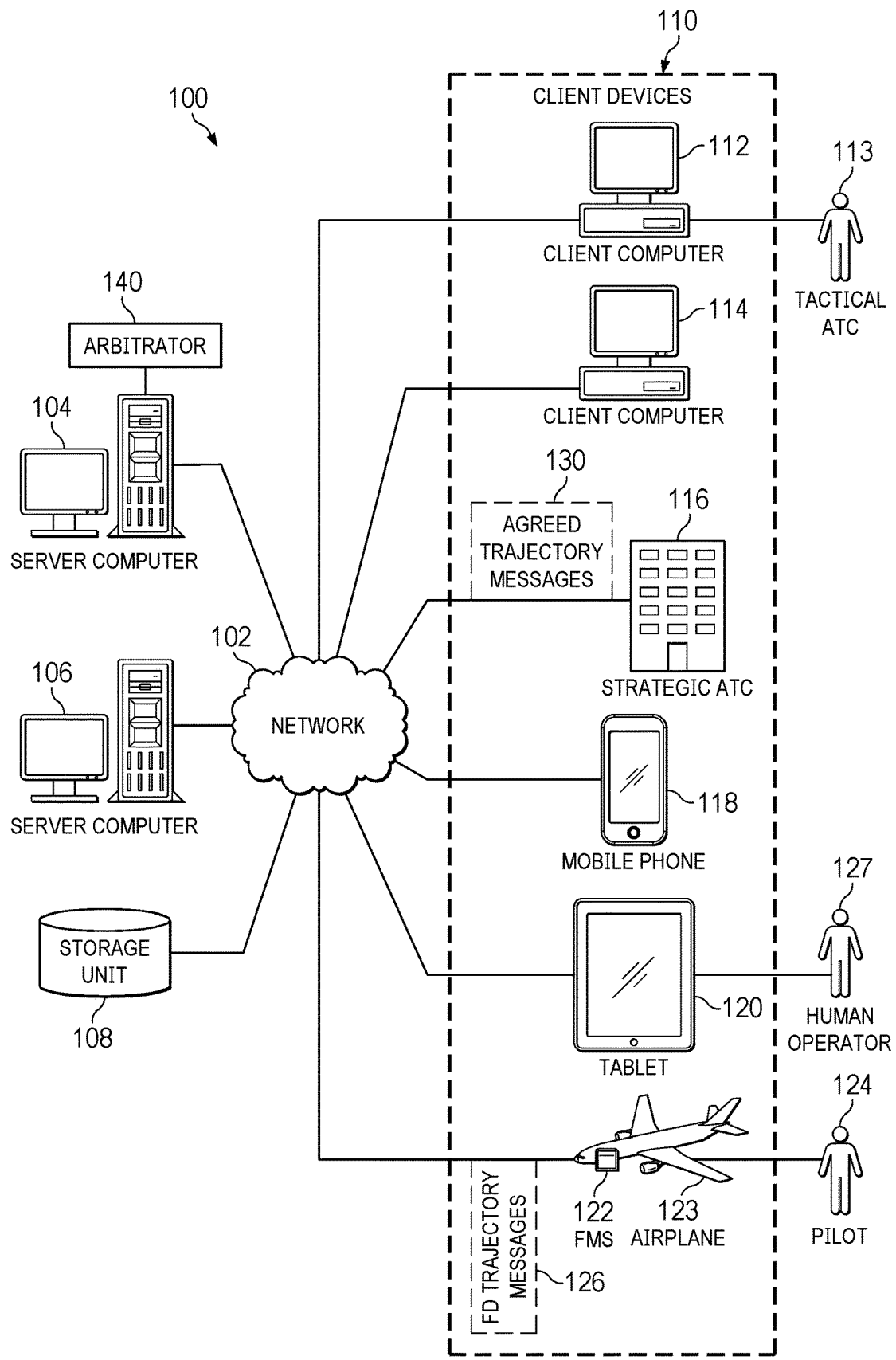
FIG. 1 is a pictorial representation of a network of data processing systems depicted in which illustrative embodiments may be implemented.

The illustrative embodiments recognize and take into account one or more different considerations as described herein. For example, the illustrative embodiments recognize and take into account that managing the trajectory of aircraft using multiple messaging systems can be complex and difficult given the importance of accurate trajectory management. To have improved guidance provided by the trajectory messages on the flight deck, it would be required for certification purposes to have a single trajectory with control authority. For example, it would be desirable to have a method and apparatus that overcomes a problem with having two distinct sources of trajectory data on the airplane flight deck and automatically arbitrate the trajectories communicated from these two sources using different messaging standards.

Adoption of CPDLC in place of voice-based air traffic control clearance has been slow to occur. The use of CPDLC can be limited because of the short-term horizon or time for changing trajectories using an air traffic controller in the current sector of an aircraft and air traffic controller's well-established phraseology. Thus, the current CPDLC messaging currently used with flight management computers replicates the shorter time period traditionally used with voice communications and expanded time horizons for which trajectory changes can be made. These features can mitigate the current tactical air traffic controller's lack of situational awareness and inability to coordinate trajectory changes further out in time.

The addition of new data processing devices complementing an aircraft computer system such as a flight management system provides an opportunity to benefit from longer prediction horizons through trajectory messages from these new data processing devices. These devices can be electronic flight bags which may be laptops, mobile phones, tablet computers, or other types of data processing devices. These data processing devices add to the ability to make trajectory changes for a future portion of the trajectory for a future time that is farther out as compared to CPDLC used by the flight management system.

In these examples, data processing devices can exchange messages using SWIM formats. Further, their content may not have the same accuracy as the flight management system but can be used to provide awareness of the longer-term horizons for making changes to future portions of a trajectory for an aircraft. These devices can be in communication with the airline's back-office flight operation control (FOC) centers where flight dispatchers reside.

The use of data processing devices such as electronic flight bags can provide additional capability for adjusting the trajectory of an aircraft farther out than currently occurs using the flight management system. However, the flight management system uses CPDLC messages while the electronic flight bags use SWIM messages. The flight management system is not currently designed to process and use SWIM messages. These changes cannot be made without an extensive certification process.

Thus, the illustrative examples can arbitrate between two sources of trajectory messages to ensure deterministically that the flight management system (FMS) always has control authority over the strategic negotiations with air traffic controllers (ATCs) in the strategic air traffic control system. In these examples, the flight management system can process and implement trajectory messages exchanged with a tactical air traffic controller (ATC) at an Air Route Traffic Control Center (ARTCC) using CPDLC. The electronic flight bag can process and negotiate changes to the trajectory with a strategic air traffic controller (ATC) at an Air Traffic Control System Command Center (ATCSCC).

The tactical ATC coordinates the trajectory for the aircraft in the current sector in which the aircraft is located, the agreed trajectory changes are loaded in the flight management system. The strategic ATC can manage and make changes to the trajectory for the aircraft for future portions outside of the current sector.

In the illustrative examples, an arbitrator in a computer system can arbitrate the merging of trajectory messages from electronic flight bag and from the flight management system to deterministically ensure desired and timely processing of messages from multiple sources based on priority of the messages. For example, the arbitrator ensures sufficient time is present for the flight management system to process and integrate a trajectory change to a future portion of the trajectory prior to aircraft reaching future air traffic control sectors. Sufficient time is given to avoid conflict with air traffic control instructions in the current sector. This kind of management of the trajectory for the aircraft can occur while the aircraft is en route flying the trajectory from its departure to its destination.

Thus, a method, apparatus, system, and computer program product are provided for managing a trajectory for an aircraft. In one illustrative example, a computer system receives an agreed trajectory change for a future portion of the trajectory for the aircraft. The strategic trajectory message is approved by a strategic air traffic controller. The computer system determines whether the agreed trajectory change has been received within a strategic time horizon for making strategic changes to the trajectory. The computer system sends the agreed trajectory change for a future portion of the trajectory for the aircraft to an aircraft computer system in the aircraft in response to the agreed trajectory change being received within the strategic time horizon.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, satellite communications, or fiber optic cables.

In the depicted example, server computer 104 and server computer 106 connect to network 102 along with storage unit 108. In addition, client devices 110 connect to network 102. As depicted, client devices 110 include client computer 112, client computer 114, and strategic air traffic controller 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and flight management system (FMS) 122. Other devices can include, for example, an aircraft interface device (AID) (not shown).

In this illustrative example, server computer 104, server computer 106, storage unit 108, and client devices 110 are network devices that connect to network 102 in which network 102 is the communications media for these network devices. Some or all of client devices 110 may form an Internet of things (IOT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, satellite, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, flight management system (FMS) 122 is a computer system located in airplane 123 operated by pilot 124. In this example, airplane 123 flies on a trajectory from an origination location to a destination location. The trajectory of airplane 123 is the route that airplane 123 flies from a departure location to a destination location. The data for this trajectory is located in FMS 122. Changes to this trajectory flown by airplane 123 can be made by FMS 122 in response to receiving messages from different sources to change the trajectory.

FMS 122 can receive changes to the trajectory from tactical air traffic controller (ATC) 113 using client computer 112. In this example, tactical ATC 113 is a human operator at an air route traffic control center (ARTCC) and is responsible for the sector in which airplane 123 is currently located.

In this example, tactical ATC 113 can operate client computer 112 to send trajectory changes in flight deck (FD) trajectory messages 126 to FMS 122 in airplane 123 over network 102. As depicted, FD trajectory messages 126 are messages sent using CPDLC.

In this example, these trajectory messages provide authorization for changes to the trajectory for airplane 123 within the sector managed by tactical ATC 113 during flight of airplane 123 in the sector. These messages can be used to adjust the trajectory of airplane 123 within the sector managed by tactical ATC 113.

Further, it is desirable to provide additional options farther ahead in the future beyond the current sector for managing the trajectory of airplane 123. Strategic planning capabilities can provide earlier flight path trajectory options and more strategic management of airplane routing to allow air traffic controllers and airspace users the ability to change the trajectory of an airplane around constraints. These constraints can be, for example, weather and airspace constraints due to congestion or obstacles.

In this illustrative example, another data processing device, such as tablet computer 120, can also be used to make changes to future portions of the trajectory for airplane 123 in addition to FMS 122. In one illustrative example, human operator 127 can be a copilot or other operator located in airplane 123 with pilot 124. In another example, human operator 127 can be a dispatcher at the flight operation control for an airline. In another example, human operator 127 can be a remote operator that can assist pilot 124 in the operation of airplane 123. In this example, the future portion of the trajectory is outside of the current sector managed by tactical ATC 113.

As depicted, these changes can be made by human operator 127 using tablet computer 120 to negotiate a trajectory change to the trajectory for airplane 123 with strategic ATC 116 over network 102. In this example, strategic ATC 116 is a software system that can operate to make adjustments to future portions of trajectories for aircraft.

These changes made through communications with strategic ATC 116 are made on a more strategic basis for future portions of the trajectory farther ahead in other sectors as compared to current management of the trajectories using tactical ATC 113 for the current sector in which airplane 123 is located.

For example, strategic ATC 116 can send agreed trajectory messages 130 to tablet computer 120 over network 102. Agreed trajectory messages 130 can be sent from strategic ATC 116 to tablet computer 120 using SWIM.

An agreed trajectory message includes an agreed trajectory for a future portion of the trajectory for airplane 123. This agreed trajectory is a trajectory change to the future portion of the trajectory for airplane 123 that has been approved by strategic ATC 116.

In this illustrative example, the trajectory algorithms used to determine trajectories for airplane 123 by tablet computer 120 and FMS 122 have different time horizons and different levels of accuracy between tablet computer 120 and FMS 122. Tablet computer 120 can be used to make changes to the trajectory for airplane 123 over a longer time horizon than the current sector in which airplane 123 is located. FMS 122 has a shorter time horizon as compared to tablet computer 120 that involves computing directly changes to the trajectory for airplane 123 in the current sector.

An overlap in the receipt of changes to the trajectories over these different time horizons is undesirable. In other words, using tablet computer 120 to make changes that can occur within the time horizon for FD trajectory messages 126 is undesirable.

For example, sending agreed trajectory messages 130 to FMS 122 from tablet computer 120 can be difficult with respect to the timing of FD trajectory messages 126 received from tactical ATC 113 and agreed trajectory messages 130 received from strategic ATC 116. Implementing those messages to make changes to the trajectory of airplane 123 in a manner that gives priority to FD trajectory messages 126 in the operation of airplane 123 can be required changes to FMS 122 that require certification.

Also, if an agreed trajectory message is received for a future portion of the trajectory that is too close to the current portion of the trajectory that airplane 123 is flying, then sending the agreed trajectory message to FMS 122 for processing may not be certifiable because FMS 122 may also be coordinating tactical FD trajectory message with the tactical ATC controller that conflicts with the agreed trajectory message. Only a single source of authority, FMS 122 in coordination with tactical ATC 113 can control the guidance provided by short time-horizon trajectory messages.

Further, trajectory messages relating to changes to the trajectory for airplane 123 are exchanged for airplane 123 using different standards. For example, FMS 122 exchanges messages using CPDLC while tablet computer 120 exchanges messages using SWIM. The FMC currently does not use SWIM for exchanging messages. Such change requires redesign and recertification.

Thus, the illustrative examples use arbitrator 140 to determine what messages should be sent to FMS 122 for processing. Further, arbitrator 140 ensures that messages sent to FMS 122 are in the format expected by FMS 122 without needing modifications to FMS 122 that would require recertification.

In this example, the sending of agreed trajectory messages to FMS 122 from tablet computer 120 are controlled by arbitrator 140. As depicted, arbitrator 140 is located in server computer 104. Server computer 104 can be in a remote location from airplane 123. In other illustrative examples, arbitrator 140 can be located in an electronic flight bag or an aircraft interface device (AID) in airplane 123.

An AID is a specialized computer system used with airplane 123 to provide a standard interface between various avionics systems and external networks. The AID can be in the aircraft and serves as a hub for exchanging data between various aircraft systems and external devices such as ground stations, satellite networks, or other aircraft.

In this illustrative example, tablet computer 120 sends agreed trajectory messages 130 received from strategic ATC 116 to arbitrator 140. Arbitrator 140 arbitrates the sending of these messages to FMS 122.

For example, arbitrator 140 prioritizes FD trajectory messages 126 over agreed trajectory messages 130 using deterministic rules for merging trajectory messages. In other words, if agreed trajectory messages 130 for changes to a future portion of the trajectory for airplane 123 are not far enough ahead in time, those messages are not sent to FMS 122 for processing. The time horizon is the time from the current time to a future point in time. If an agreed trajectory message is not for a portion of the trajectory beyond the current sector, the message is not sent to FMS 122. This time is selected to enable FMS 122 to receive and process FD trajectory messages 126 that affect the flight of airplane 123 in the current sector managed by tactical ATC 113.

For example, FD trajectory messages 126 can be received and processed for a time horizon that is 20 minutes from the current time, the typical time that airplane 123 would spend in a typical sector. With this example, arbitrator 140 does not send agreed trajectory messages 130 that cannot be processed and implemented before the 20 minute time horizon is reached.

This priority used by arbitrator 140 for FD trajectory messages 126 avoids changes to the trajectory for airplane 123 that may overlap with tactical ATC trajectory change instructions at a point in time. As result, arbitrator 140 may determine that some of agreed trajectory messages 130 are not sent to FMS 122 when those messages are for portions of the trajectory are too close in time to FD trajectory messages 126 that may be received from tactical ATC 113 for processing and implementation.

With the use of arbitrator 140, multiple trajectory messages from different sources can be coordinated in a manner that provides increased flexibility for managing the trajectory of airplane 123 on a strategic basis in addition to the current FMS management on a tactical basis. As a result, trajectory messages from different sources that may have a time horizon that overlaps can be deterministically controlled. In the illustrative examples, overlaps result in FD trajectory messages 126 having priority. As a result, agreed trajectory messages 130 that overlap FD trajectory messages are not sent to FMS 122.

Illustration of network data processing system 100 is not meant to limit the manner in which other illustrative examples can be implemented. For example, airplane 123 can be a remotely piloted airplane. With this example, pilot 124 can be in a remote location on the ground or in another vehicle or aircraft. In still another illustrative example, airplane 123 can be unmanned aerial aircraft that operates autonomously without needing a human operator such as pilot 124. Additionally, airplane 123 can also be a self-flying taxi, and unmanned aerial vehicle or other types of aircraft.

Figure 2:
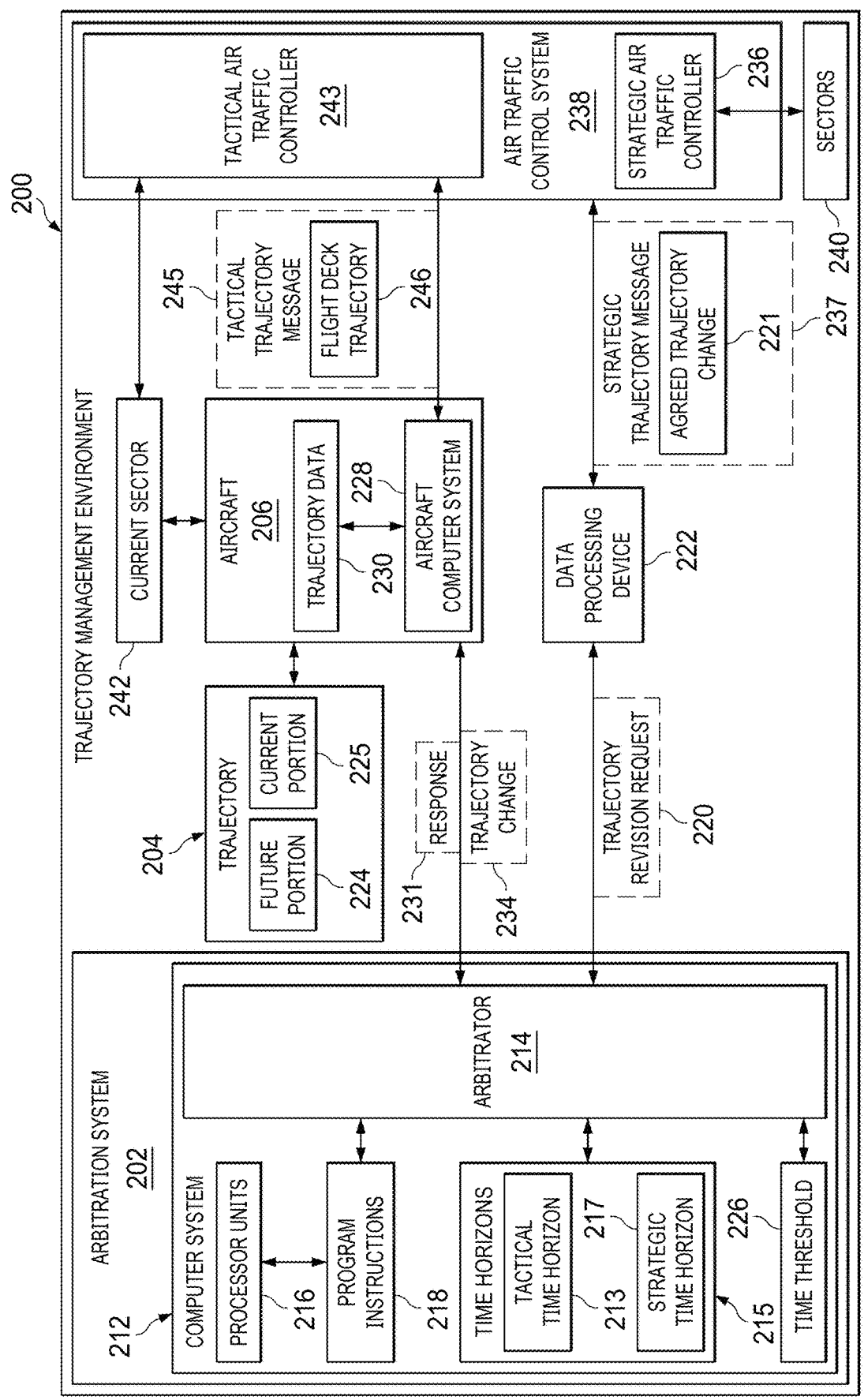
FIG. 2 is a block diagram of a trajectory management environment in accordance with an illustrative embodiment.

With reference now to FIG. 2, a block diagram of a trajectory management environment is depicted in accordance with an illustrative embodiment. In this illustrative example, trajectory management environment 200 includes components that can be implemented in hardware such as the hardware shown in network data processing system 100 in FIG. 1.

In this illustrative example, arbitration system 202 can operate to manage trajectory 204 for aircraft 206. Trajectory 204 is a flight path flown by aircraft 206. Trajectory 204 is typically from an origination point to a destination point. The origination point and destination point can be airports. In these illustrative examples, aircraft 206 can take a number different of forms. For example, aircraft 206 can be selected from a group comprising an airplane, a commercial airplane, a tilt-rotor aircraft, a tilt wing aircraft, a vertical takeoff and landing aircraft, an electrical vertical takeoff and landing vehicle, a personal air vehicle, remotely piloted aircraft, an unmanned air vehicle, and other types of aircraft that can operate using a flight management system or similar computer providing flight management functions for flying using a trajectory.

In this illustrative example, arbitration system 202 includes a number of different components. As depicted, arbitration system 202 comprises computer system 212 and arbitrator 214.

Arbitrator 214 can be implemented in software, hardware, firmware or a combination thereof. When software is used, the operations performed by arbitrator 214 can be implemented in program instructions configured to run on hardware, such as a processor unit. When firmware is used, the operations performed by arbitrator 214 can be implemented in program instructions and data and stored in persistent memory to run on a processor unit. When hardware is employed, the hardware may include circuits that operate to perform the operations in arbitrator 214.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are on the same computer or on different computers. In other words, the process can be distributed between processor units 216 on the same or different computers in a computer system 212.

Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

This illustrative example, arbitrator 214 can operate to manage trajectory 204 for aircraft 206. In this illustrative example, messages can be received with respect to changes to trajectory 204 for aircraft 206 during flight of aircraft 206.

As depicted in trajectory management environment 200, these changes can be received from multiple sources in this illustrative example. For example, tactical air traffic controller 243 can send tactical trajectory message 245 to aircraft computer system 228.

In this illustrative example, aircraft computer system 228 is a computer system located in aircraft 206 that manages trajectory 204 for aircraft 206. Aircraft computer system 228 comprises one or more computers and when more than one computer is present, those computers are in communication with each other using a communications medium such as a network, satellites or bus. Aircraft computer system 228 can provide other functions including navigation, flight planning, and other functions used in operating aircraft 206. In this illustrative example, aircraft computer system 228 can be selected from a group comprising a flight management system, a flight control computer system, or an onboard computer for an aircraft that can manage a trajectory for the aircraft.

Tactical trajectory message 245 can be sent to make changes to trajectory 204 for aircraft 206 as part of tactical air traffic controller 243 performing separation functions. In this example, tactical trajectory message 245 contains flight deck trajectory 246, which specifies a change to trajectory 204. This tactical trajectory message is also referred to as a flight deck (FD) trajectory message and is sent using CPDLC standards.

As another example, strategic air traffic controller 236 can send strategic trajectory message 237 to make changes to trajectory 204 for aircraft 206. Strategic trajectory message 237 contains agreed trajectory change 221, which is a change to future portion 224 of trajectory 204 for aircraft 206. In this example, strategic trajectory message 237 is sent using SWIM standards. As depicted, strategic air traffic controller 236 is a process such as a software process in a computer system.

In this depicted example, tactical air traffic controller 243 is the primary authority for making changes to trajectory 204, and strategic air traffic controller 236 is a secondary authority for making changes to trajectory 204. In these examples, trajectory 204 being flown by aircraft 206 is cleared by air traffic control system 238. Arbitrator 214 manages the processing of these messages based on priority to tactical air traffic controller 243.

Arbitrator 214 can manage these messages based on time horizons 215. In this illustrative example, a time horizon identifies future point in time from the current location point for the current point in time that aircraft 206 is at.

Time horizons 215 can include tactical time horizon 213 and strategic time horizon 217. In this example, a tactical time horizon 213 is a time period in which messages relating to trajectory 204 of aircraft 206 can be received for processing from tactical air traffic controller 243. Strategic time horizon 217 is a time horizon during which strategic trajectory messages are sent to aircraft computer system 228 for processing.

In this illustrative example, arbitrator 214 can determine whether to send agreed trajectory change 221 received in strategic trajectory message 237 to aircraft computer system 228 in aircraft 206. In this example, arbitrator 214 determines whether agreed trajectory change 221 can be processed before tactical trajectory messages can be expected. This determination can be made by arbitrator 214 based on when agreed trajectory change 221 is received by arbitrator 214. If agreed trajectory change 221 is received outside of strategic time horizon 217, agreed trajectory change 221 in strategic trajectory message 237 not sent to aircraft computer system 228 for processing. Messages received outside of strategic time horizon 217 can have a possibility of still being processed when tactical time horizon 213 is reached by aircraft 206.

If agreed trajectory change 221 is received within strategic time horizon 217, arbitrator 214 sends agreed trajectory change 221 in strategic trajectory message 237 to aircraft computer system 228 for processing. As a result, strategic trajectory messages received from strategic air traffic controller 236 within tactical time horizon 213 and outside of strategic time horizon 217 are not sent to aircraft computer system 228 for processing.

In this illustrative example, tactical time horizon 213 can be selected based on when tactical trajectory messages can be received from tactical air traffic controller 243, the size of the air traffic control sector, or other airspace considerations. Strategic time horizon 217 can be selected based on ensuring that strategic trajectory messages can be processed before aircraft 206 reaches tactical time horizon 213. Thus, in this example, strategic trajectory messages received by arbitrator 214 within strategic time horizon 217 are sent to aircraft computer system 228 for processing.

In this manner, aircraft computer system 228 is not processing agreed trajectory change 221 when tactical trajectory messages can be received with ATC clearances for processing for tactical air traffic controller 243. As depicted, agreed trajectory change 221 is not sent if this change is received outside of strategic time horizon 217. Using strategic time horizon 217 enables ensuring that aircraft computer system 228 can complete processing any messages before reaching tactical time horizon 213. As a result, trajectory merging priority can be maintained for processing ATC clearances or other items in tactical trajectory messages.

In this illustrative example, strategic trajectory message 237 is not received directly by aircraft computer system 228 from strategic air traffic controller 236. As depicted, data processing device 222 receives strategic trajectory message 237 from strategic air traffic controller 236. This message can be received using a System Wide Information Management (SWIM) format.

In this illustrative example, data processing device 222 can take a number of different forms. For example, data processing device 222 can be a portable processing device that can be carried by a human operator. Data processing device 222 can be selected from a group comprising an electronic flight bag, a mobile phone, a laptop computer, a tablet computer, an aircraft interface device, and other data processing devices.

Data processing device 222 can be in a number of different locations. For example, data processing device 222 can be located in aircraft 206, a ground location, a building, a back office flight operation control (FOC) center, a ship, and another aircraft. aircraft, or in some other suitable location. In this illustrative example, arbitrator 214 receives trajectory revision request 220 from data processing device 222. This request is sent using a System Wide Information Management (SWIM) format. In this example, trajectory revision request 220 is an FF-ICE standard request to change future portion 224 of trajectory 204 for aircraft 206.

In one illustrative example, trajectory revision request 220 can include agreed trajectory change 221. Trajectory revision request 220 can be made to change future portion 224 of trajectory 204 for aircraft 206 in response to the at least one of weather, traffic causing an airspace constraint, a new airspace restriction, or some other event or condition resulting as constrain on future portion 224 of trajectory 204.

In this example, agreed trajectory change 221 is an improved trajectory change that resulted from a negotiation between data processing device 222 and strategic air traffic controller 236 in air traffic control system 238. Strategic air traffic controller 236 handles sectors 240 outside of current sector 242 for aircraft 206.

In these illustrative examples, a sector is a defined volume of airspace for which a team of air traffic controllers, such as tactical air traffic controller 243 in an Air Route Traffic Control Center (ARTCC), have responsibility for any given time. In this example, current sector 242 is the sector in which aircraft 206 is currently located.

Authorizations or clearances to change the portion of trajectory 204 in current sector 242 are handled by tactical air traffic controller 243 in an ARTCC facility air traffic control system 238. In this example, these types of changes to trajectory 204 are made between tactical air traffic controller 243 and aircraft computer system 228 using a Controller Pilot Datalink Communication (CPDLC) format.

In this example, arbitrator 214 determines whether future portion 224 of trajectory 204 is for a time greater than time threshold 226 for aircraft computer system 228 in aircraft 206 to change future portion 224 of trajectory 204.

For example, time threshold 226 can be a selected flying time from the current airplane location. Time threshold 226 can be based on the start of strategic time horizon 217.

For example, time threshold 226 can be 3 minutes, 5 minutes, 20 minutes or more flying time from the current airplane location. If trajectory revision request 220 is received farther out than time threshold 226 from the current time, it is assumed that trajectory revision request 220 can be processed by the aircraft computer system without conflict or overlap with tactical trajectory messages.

In this illustrative example, trajectory 204 can be represented as trajectory data 230 that is used by aircraft computer system 228 to manage trajectory 204. The trajectory data 230 comprise a sequence of spatial points ordered by timestamps. Further, spatial points can also include descriptive information. The spatial points can also be referred to as waypoints in some illustrative examples. These waypoints provide a common reference of where aircraft 206 is expected to be at a particular point in time for key points along trajectory 204.

In the illustrative example, arbitrator 214 sends trajectory revision request 220 to aircraft computer system 228 in aircraft 206 in response to future portion 224 of trajectory 204 being for the time greater than time threshold 226. In this illustrative example, trajectory revision request 220 contains strategic trajectory message 237 with agreed trajectory change 221.

Arbitrator 214 can receive response 231 to trajectory revision request 220 from aircraft computer system 228 in response to sending trajectory revision request 220 to aircraft computer system 228. Response 231 can take a number of different forms. For example, response 231 to the trajectory revision request is from of a group comprising an acceptance indicating that agreed trajectory change 221 has been processed to update trajectory 204 for aircraft 206, a rejection indicating that the trajectory revision request has been rejected, and a proposed change to the trajectory change.

Arbitrator 214 can send trajectory change 234 for future portion 224 of trajectory 204 in response to future portion 224 of trajectory 204 being for the time greater than time threshold 226. In this illustrative example, trajectory change 234 contains trajectory data 230 defining the change to future portion 224 of trajectory 204.

In this illustrative example, trajectory change 234 for future portion 224 is agreed trajectory change 221 resulting from negotiation between data processing device 222 and strategic air traffic controller 236 in air traffic control system 238. As depicted, data processing device 222 communicates with strategic air traffic controller 236 using System Wide Information Management (SWIM) messages.

In one illustrative example, one or more technical solutions are present that overcome a technical problem with managing changes to trajectories for aircraft from multiple sources. As a result, one or more technical solutions may provide a technical effect managing a trajectory for an aircraft in which trajectory changes can be received from multiple sources.

Computer system 212 can be configured to perform at least one of the steps, operations, or actions described in the different illustrative examples using software, hardware, firmware or a combination thereof. As a result, computer system 212 operates as a special purpose computer system in which arbitrator 214 in computer system 212 enables managing a trajectory for an aircraft in which arbitrator 214 transforms computer system 212 into a special purpose computer system as compared to currently available general computer systems that do not have arbitrator 214.

In the illustrative example, the use of arbitrator 214 in computer system 212 integrates processes into a practical application for managing a trajectory for an aircraft that performance of computer system 212 in sending trajectory changes to an aircraft computer system in a manner that that reduces or avoids the aircraft computer system from receiving a high-priority message while processing a lower priority message. In these illustrative examples, messages from a tactical air traffic controller are provided a higher priority as compared to those from a strategic air traffic controller.

The illustration of trajectory management environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, arbitrator 214 can handle changes for one or more aircraft in addition to aircraft 206. Additionally, although data processing device 222 is shown as being in a location outside of aircraft 206, data processing device 222 can be located in aircraft 206 in some illustrative examples.

Figure 3:
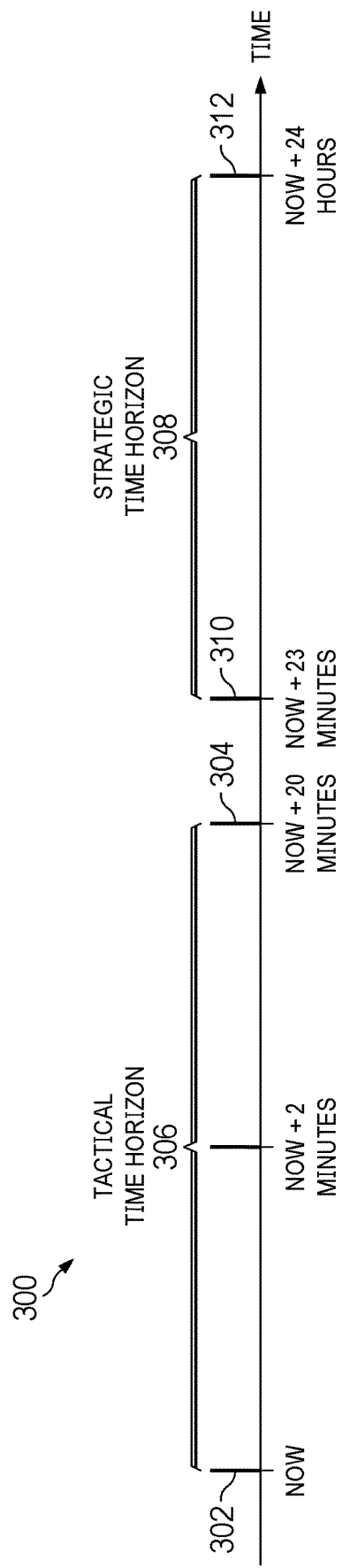
FIG. 3 is an illustration of time horizons on a timeline in accordance with an illustrative embodiment.

With reference next to FIG. 3, an illustration of time horizons on a timeline is depicted in accordance with an illustrative embodiment. In this illustrative example, timeline 300 is time starts at the time corresponding to the current airplane location shown as now 302. In this illustrative example, separation management can occur from current time now 302 to current time+20 minutes 304. In other words, tactical trajectory messages can be received from a tactical air traffic controller for the current sector in which the aircraft is located at any time from now through current time+20 minutes 304. In this example, the airplane separation management period is tactical time horizon 306.

In this illustrative example, changes negotiated with the strategic air traffic controller can be received at different times. As depicted, strategic time horizon 308 is a time period set from now+23 minutes 310 to now+24 hours 312 as the time period during which strategic trajectory messages are sent by the arbitrator to the aircraft computer system for processing. These time horizons can be used to determine when strategic trajectory changes are sent to an aircraft computer system such as a flight management system for processing to update or change a trajectory for the aircraft.

In this example, a strategic trajectory message containing an agreed trajectory change received closer to the current time than now+23 minutes 310 is outside of strategic time horizon 308 and is not sent by the arbitrator to the aircraft computer system. In this illustrative example, a 3 minute buffer is set from now+20 minutes 304 at the end of tactical time horizon 306 to now+23 minutes 310 at the beginning of strategic time horizon 308.

In this example, now+20 minutes is the end of tactical time horizon 306 indicating how far out in time tactical trajectory messages are expected from now 302. The 3 minute time buffer between now+20 minutes 304 in tactical time horizon 306 and now+23 minutes 310 for strategic time horizon 308 is selected to take into account time needed for the aircraft computer system to process a message received at now+23 minutes 310.

The selection is made in this example to avoid a situation in which the aircraft computer system is not finished processing a message received in strategic time horizon 308 when messages can be expected from a tactical air traffic controller in tactical time horizon 306. Also, delays in communications caused by when the data processing device being located on the ground can affect the selection of the time horizons.

Figure 4:
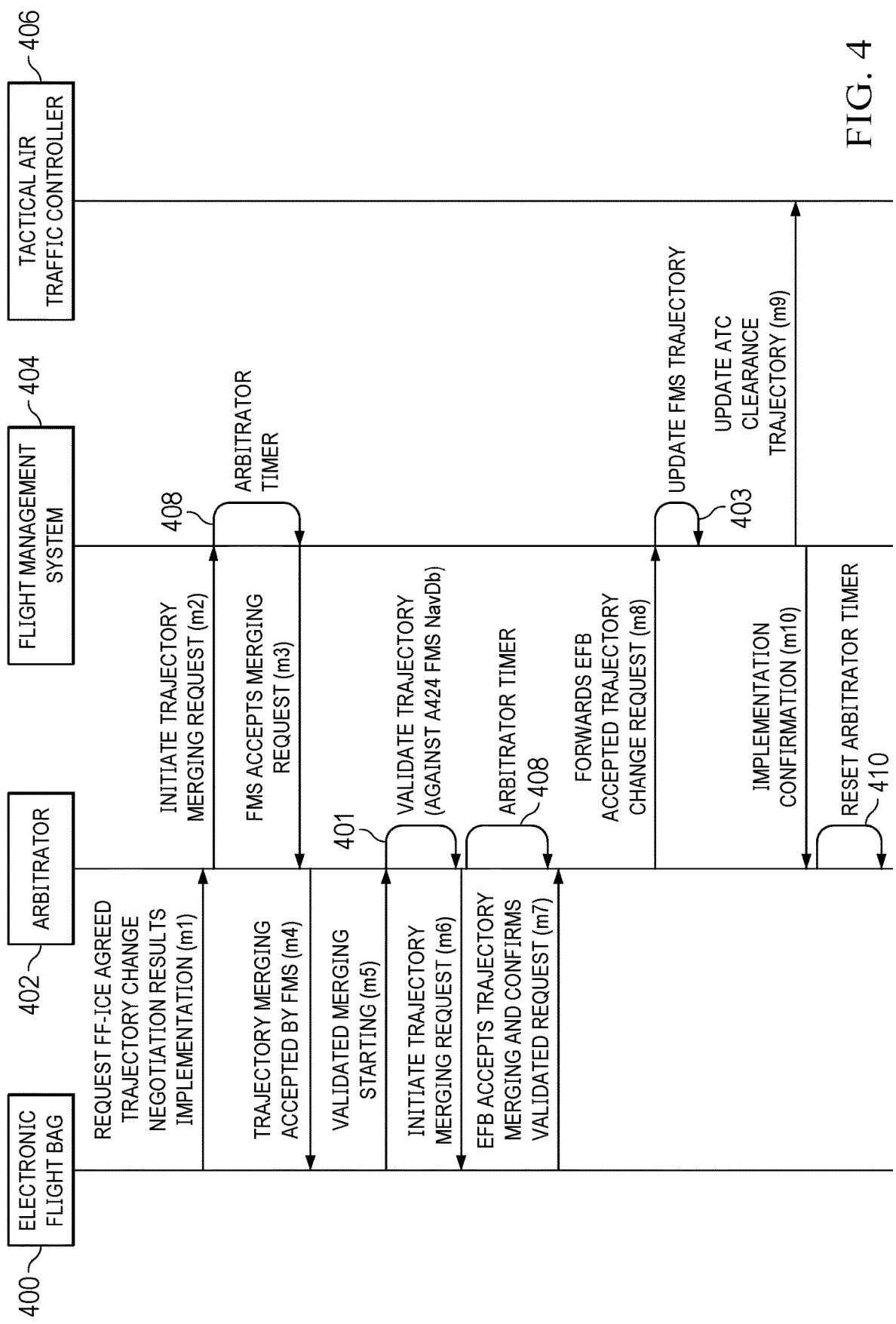
FIG. 4 is an illustration of message flow diagram for processing changes to trajectories in accordance with an illustrative embodiment.

Turning next to FIG. 4, an illustration of message flow diagram for processing changes to trajectories is depicted in accordance with an illustrative embodiment. In this example, the message flow includes electronic flight bag 400, arbitrator 402, flight management system 404, and tactical air traffic controller 406. Electronic flight bag 400 is an example of an implementation for data processing device 222 in FIG. 2. Arbitrator 402 is an example of arbitrator 214 in FIG. 2. Flight management system 404 is an example of an implementation for aircraft computer system 228 in FIG.

2. Tactical air traffic controller 406 is an example of tactical air traffic controller 243 in FIG. 2.

In this illustrative example, electronic flight bag 400 sends a message indicating the FF-ICE negotiations on a future portion of the trajectory of aircraft is agreed to and this agreed trajectory change is ready to be implemented by arbitrator 402 (message m1). This agreed to trajectory change re-routes the airplane around flow constrained airspace that may be caused by weather, air traffic, changes in airspace restrictions, or other airspace constraints.

In response receiving the request, arbitrator 402 sends a request to initiate merging to flight management system 404 (message m2). In this example, this request is sent back as accepted if flight management system 404 determines that sufficient time is present for flight management system 404 to process the request.

Additionally, arbitrator 402 can start arbitrator timer 408 to ensure the messages from m1 to m8 have to be processed before reaching the strategic time horizon and to ensure sufficient time is present for the flight crews review and reaction to take action. This timer can be, for example, 10 minutes. In this example, this the length of this timer can be implemented by measuring the latency between messages m2 and m3 and or messages m6 and m7 as well as ensuring the airplane remains within the strategic time horizon.

In this example, arbitrator 402 receives a merging accepted confirmation from flight management system 404 (message m3). This response message indicates that flight management system accepts and is ready for the merged trajectory request from arbitrator 402 and is ready to process the agreed trajectory change.

As depicted, arbitrator 402 sends a message to electronic flight bag 400 indicating that the merging has been accepted by flight management system 404 (message m4). When electronic flight bag 400 receives message m4, electronic flight bag 400 should be ready to send the agreed trajectory revision request.

In response, electronic flight bag 400 sends agreed trajectory change to arbitrator 402 (message m5). In message m5, electronic flight bag 400 sends the information about the agreed trajectory change. For example, waypoints, and other information can be sent in this message.

Arbitrator 402 validates the information (step 401) using the certified data from the ARINC 424 Navigation database and in response to validating information, arbitrator 402 forwards the same set of messages as with flight management system 404 in the reverse order with electronic flight bag 400. Arbitrator 402 sends a message to initiate negotiations to electronic flight bag 400 (message m6).

Electronic flight bag 400 sends a negotiations confirmation to arbitrator 402 (message m7). In message m7, the electronic flight bag indicates acceptance of the negotiation request.

Arbitrator 402 sends the agreed trajectory change to flight management system 404 for processing (message m8). Flight management system 404 updates the trajectory using the agreed trajectory change (step 403).

In response to implementing the agreed trajectory change to the current trajectory of aircraft, flight management system 404 sends a clearance message to tactical air traffic controller 406 (message m9). This clearance message identifies the change made to the trajectory using the agreed trajectory change.

Additionally, flight management system 404 returns implementation confirmation to arbitrator 402 in response to updating the trajectory using the agreed trajectory change (message m10). This confirmation can be relayed to electronic flight bag 400. In other illustrative examples, the trajectory change can be detected by electronic flight bag 400 from the aircraft radar tracks widely available to the public (e.g., ADS-B data). The arbitrator timer is then reset (step 410).

The illustration of the message flow in this example is depicted to illustrate one manner in which an agreed trajectory change can be sent to a flight management system using arbitrator 402. This illustration is not meant to limit the manner in which other illustrative examples can be implemented. For example, in another illustrative example message m1 can include the agreed trajectory change. With this example, the agreed trajectory change can also be sent as part of sending and initiating merging request and message m2.

Figure 5:
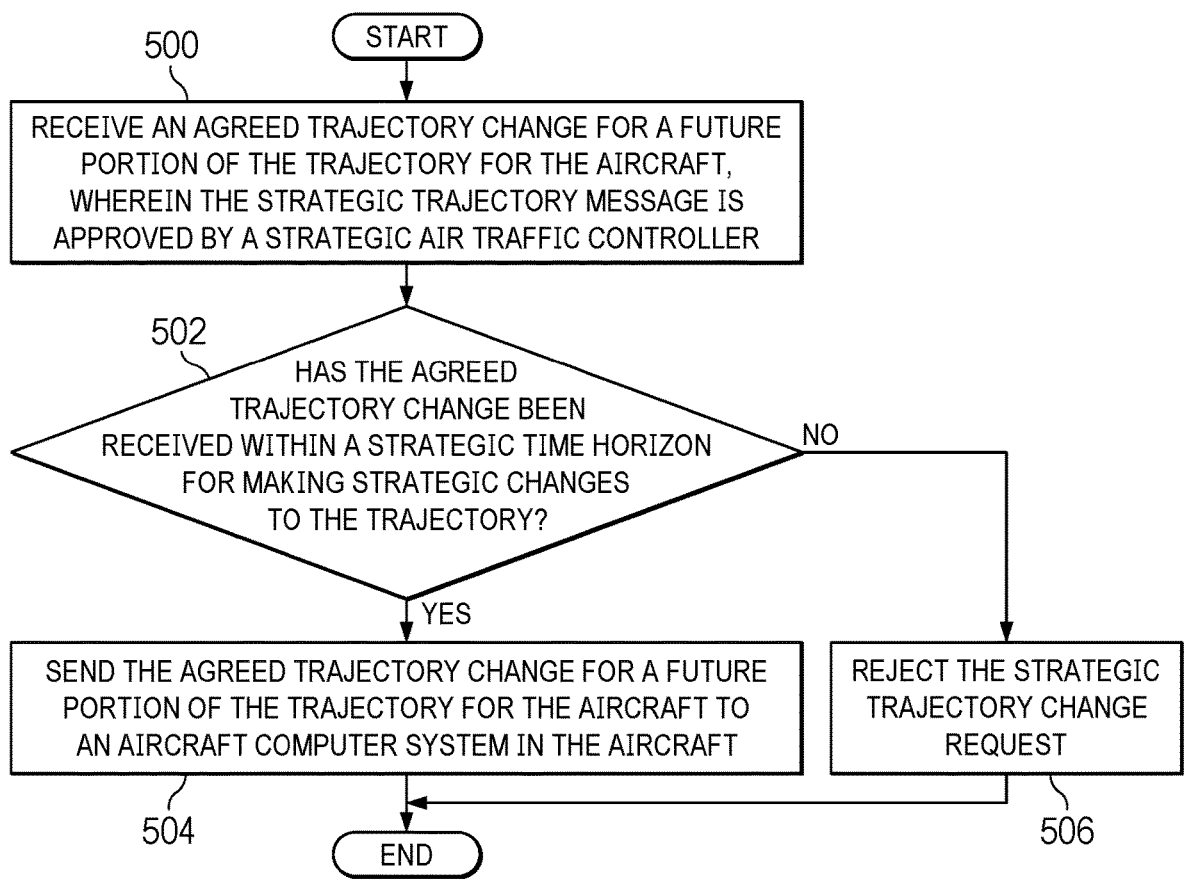
FIG. 5 is a flowchart of a process for managing a trajectory of an aircraft in accordance with an illustrative embodiment.

Turning next to FIG. 5, a flowchart of a process for managing a trajectory of an aircraft is depicted in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in arbitrator 214 in computer system 212 in FIG. 2.

The process begins by receiving an agreed trajectory change for a future portion of the trajectory for the aircraft, wherein the strategic trajectory message is approved by a strategic air traffic controller (operation 500). In operation 500 the approval by the strategic air traffic controller can be part of FF-ICE collaboration on strategic trajectory changes. The process determines whether the agreed trajectory change has been received within a strategic time horizon for making strategic changes to the trajectory (operation 502).

In response to the agreed trajectory change being received within the strategic time horizon, the process sends the agreed trajectory change for a future portion of the trajectory for the aircraft to an aircraft computer system in the aircraft (operation 504). The process terminates with respect to this received agreed trajectory change. The process can return to operation 500 to handle a new strategic request while the aircraft remains in en route airspace where strategic route changes can be timely executed (e.g., above 19,000 feet).

With reference again to step 502, if the agreed trajectory change was not received within the strategic time horizon, the process rejects the strategic trajectory change request (operation 506), and the process terminates thereafter. This process can be reinitiated response to receiving another agreed trajectory change in a message such as a new FF-ICE request. In this case, the agreed trajectory change is not sent to the aircraft computer system for processing to change the future portion of the trajectory.

Figure 6:
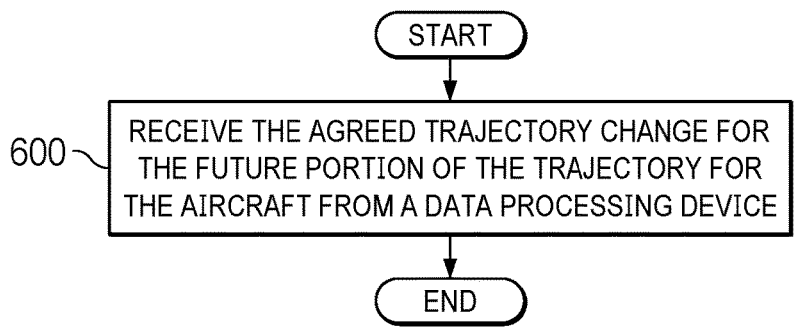
FIG. 6 is a flowchart of a process for receiving an agreed trajectory change in accordance with an illustrative embodiment.

With reference next to FIG. 6, a flowchart of a process for receiving an agreed trajectory change is depicted in accordance with an illustrative embodiment. The flowchart in FIG. 6 is an example of an implementation for operation 500 in FIG. 5.

The process receives the agreed trajectory change for the future portion of the trajectory for the aircraft from a data processing device (operation 600). The process terminates thereafter. In this operation, strategic trajectory message has been approved by the strategic air traffic controller and is now being implemented.

Figure 7:
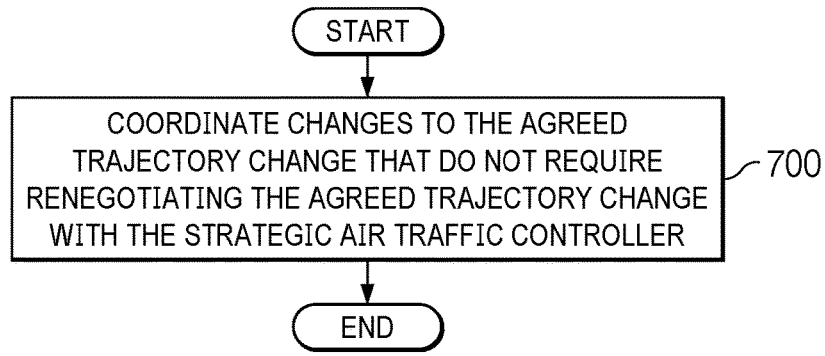
FIG. 7 is a flowchart of a process for coordinating changes to an agreed trajectory change depicted in accordance with an illustrative embodiment.

With reference now to FIG. 7, a flowchart of a process for coordinating changes to an agreed trajectory change is depicted in accordance with an illustrative embodiment. The operation in this flowchart is an example of an additional operation that can be performed with the operations in FIG. 5.

The process coordinates changes to the agreed trajectory change that do not require renegotiating the agreed trajectory change with the strategic air traffic controller (operation 700). The process terminates thereafter. In operation 700, this negotiation can occur between the aircraft computer system and the electronic flight bag.

In operation 700, a change that does not require renegotiating the agreed trajectory with the 2 digit air traffic controller can be for example, the aircraft computer system proposing using a different name for a waypoint in the computer's ARINC 424 navigation database. Further, with respect to the granularity of waypoints, the aircraft computer system may suggest a different waypoint that is sufficiently close to the waypoints in the agreed trajectory change or that closes a discontinuity in the path of the aircraft. Further, with respect to the reference data used for the agreed trajectory, slight variations may be present in databases or update cycles between the strategic and tactical data references and the high integrity navigation database on the aircraft needs to be the referenced.

Figure 8:
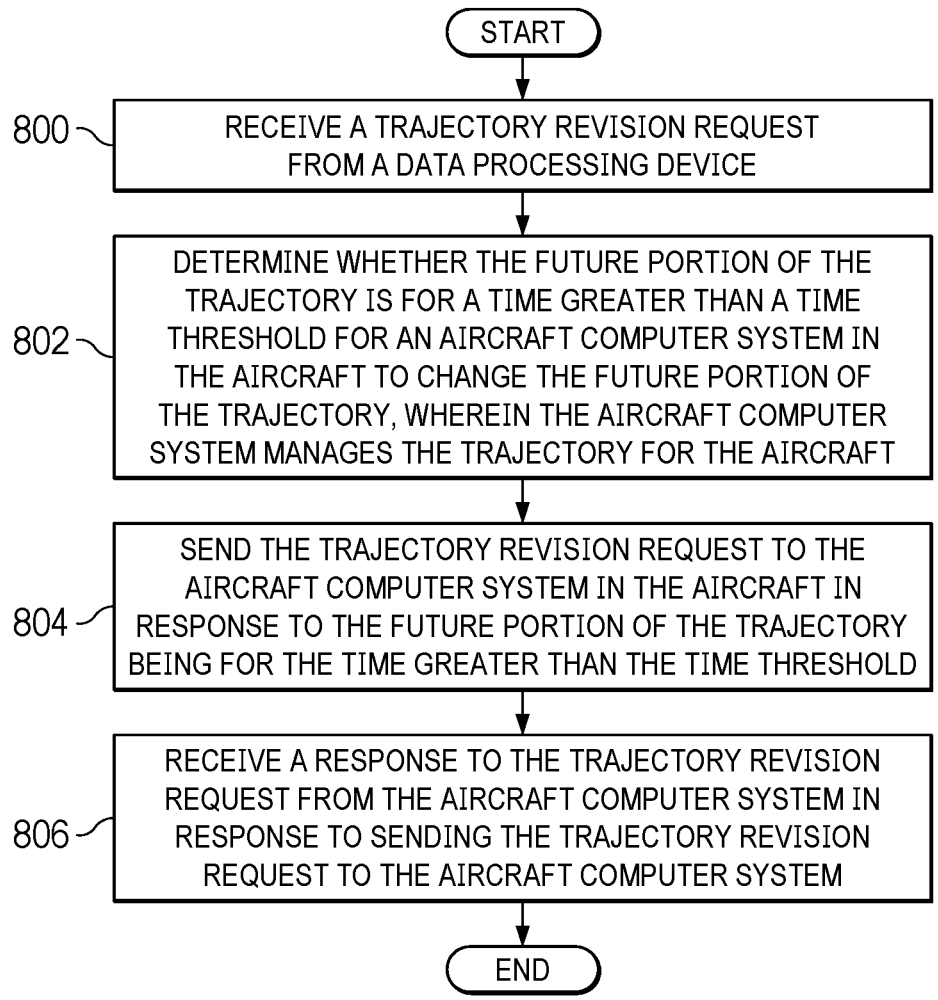
FIG. 8 is a flowchart of a process for managing a trajectory of an aircraft in accordance with an illustrative embodiment.

Turning now to FIG. 8, a flowchart of a process for managing a trajectory of an aircraft is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in arbitrator 214 in computer system 212 in FIG. 2.

The process begins by receiving a trajectory revision request from a data processing device (operation 800). In operation 800, the trajectory revision request is a request to change a future portion of the trajectory for the aircraft. This trajectory revision request can be made to change the future portion of the trajectory for the aircraft in response to the at least one of weather, traffic causing an airspace constraint, or a new airspace restriction.

Further, the trajectory revision request can include an agreed trajectory change resulting from a negotiation between the data processing device and a strategic air traffic controller in an air traffic control system that handles sectors outside of a current sector for the aircraft.

The process determines whether the future portion of the trajectory is for a time greater than a time threshold for an aircraft computer system in the aircraft to change the future portion of the trajectory, wherein the aircraft computer system manages the trajectory for the aircraft (operation 802). The time threshold can be set on a strategic time horizon.

The process sends the trajectory revision request to the aircraft computer system in the aircraft in response to the future portion of the trajectory being for the time greater than the time threshold (operation 804). In operation 804, the request can be displayed to the flight crew members on the flight deck as a provisional flight plan or inactive flight plan. Further in operation 804, the trajectory change for the future portion is an agreed trajectory change resulting from a negotiation between the data processing device and a strategic air traffic controller in an air traffic control system, wherein strategic air traffic controller handles sectors outside of a current sector for the aircraft.

The process receives a response to the trajectory revision request from the aircraft computer system in response to sending the trajectory revision request to the aircraft computer system (operation 806). In operation 806, the process can also receive an acknowledgement from a flight crew member that transfers the provisional or inactive flight plan in the flight management system to the FMS active flight plan. The process terminates thereafter. This process can be initiated each time a trajectory revision request is received from the data processing device as part of future ATC clearance exchanges with the tactical air traffic controller to include the full trajectory stored in the FMS active flight plan.

In operation 806, response to the trajectory revision request is selected indicating that the trajectory change has been processed to update the trajectory for the aircraft, a rejection indicating that the trajectory revision request has been rejected, and a proposed change to the trajectory change. In this example, the selection can be made after the flight crew review.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
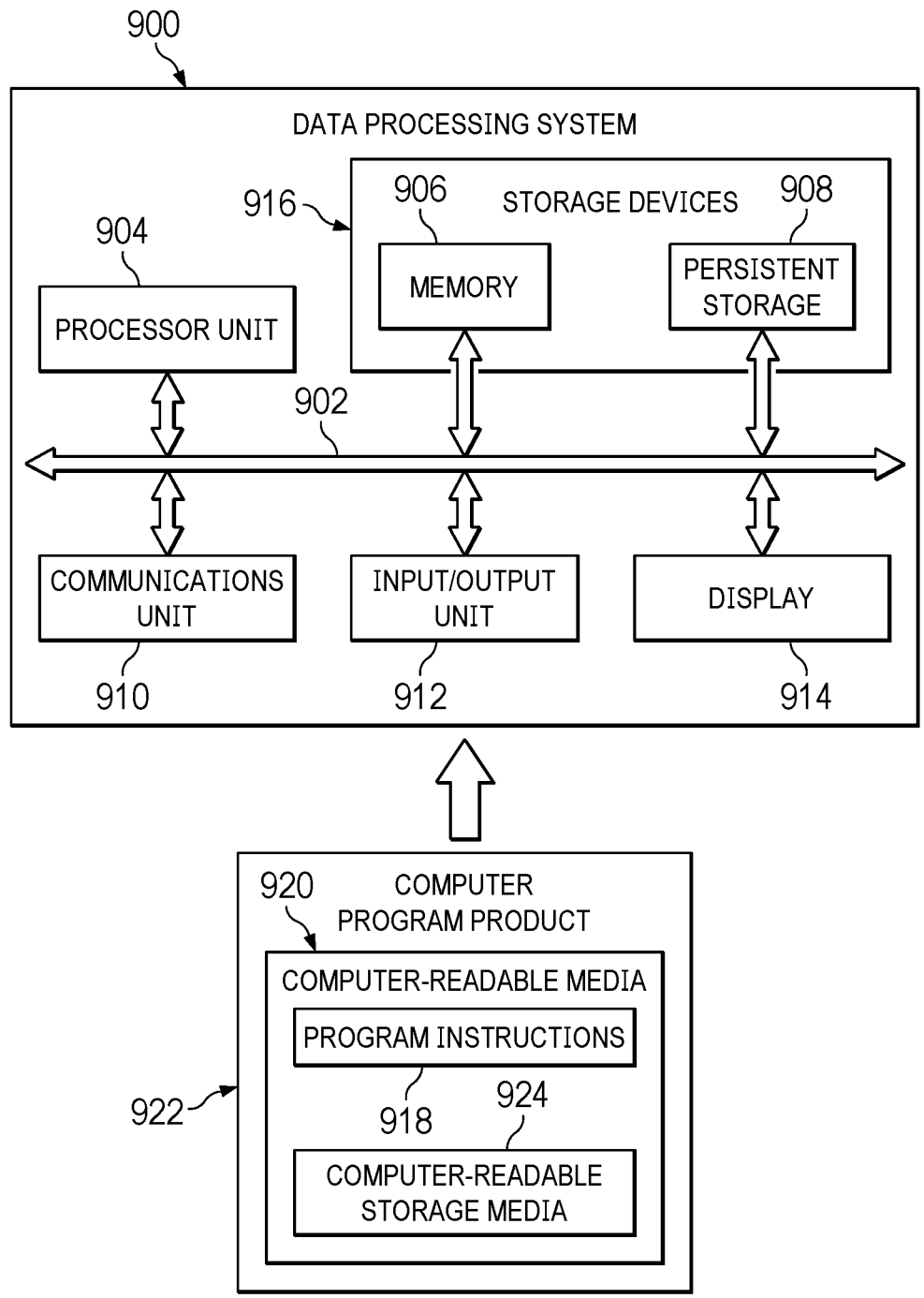
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 212 in FIG. 2, aircraft computer system 228 in FIG. 2, and data processing device 222 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program instructions, computer usable program instructions, or computer-readable program instructions that can be read and executed by a processor in processor unit 904. The program instructions in the different embodiments can be embodied on different physical or computer-readable storage media, such as memory 906 or persistent storage 908.

Program instructions 918 are located in a functional form on computer-readable media 920 that is selectively removable and can be loaded onto or transferred to data processing system 900 for execution by processor unit 904. Program instructions 918 and computer-readable media 920 form computer program product 922 in these illustrative examples. In the illustrative example, computer-readable media 920 is computer-readable storage media 924.

Computer-readable storage media 924 is a physical or tangible storage device used to store program instructions 918 rather than a medium that propagates or transmits program instructions 918. Computer-readable storage media 924 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 924, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 918 can be transferred to data processing system 900 using a computer-readable signal media. The computer-readable signal media are signals and can be, for example, a propagated data signal containing program instructions 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program instructions 918 can be located in computer-readable media 920 in the form of a single storage device or system. In another example, program instructions 918 can be located in computer-readable media 920 that is distributed in multiple data processing systems. In other words, some instructions in program instructions 918 can be located in one data processing system while other instructions in program instructions 918 can be located in one data processing system. For example, a portion of program instructions 918 can be located in computer-readable media 920 in a server computer while another portion of program instructions 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program instructions 918.

The illustrative examples provide a method, apparatus, system, and computer program product for managing a trajectory for an aircraft. A computer system receives an agreed trajectory change for a future portion of the trajectory for the aircraft. The strategic trajectory message is approved by a strategic air traffic controller. The computer system determines whether the agreed trajectory change has been received within a strategic time horizon for making strategic changes to the trajectory. The computer system sends the agreed trajectory change for a future portion of the trajectory for the aircraft to an aircraft computer system in the aircraft in response to the agreed trajectory change being received within the strategic time horizon.

In one or more illustrative examples, the arbitrator handles high-integrity messages from a tactical air traffic controller with priority. As a result, other messages such as those from the strategic air traffic controller are given a lower priority. With this priority system, the arbitrator manages the sending of messages from a strategic air traffic controller in a manner that reduces or avoids an aircraft computer system from receiving a message from a tactical air traffic controller while processing a message for a strategic air traffic controller.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a trajectory for an aircraft, the method comprising:
   receiving, in a data processing device, an agreed trajectory change coded in a first format for a future portion of the trajectory for the aircraft, wherein a strategic air traffic controller located separate from the aircraft and negotiating with the data processing device formed the agreed trajectory change;
   determining, in a computer system, whether the agreed trajectory change has been received within a strategic time horizon for making strategic changes to the trajectory;
   transforming, by the computer system, the agreed trajectory change from the first format into a trajectory change coded in a second format; and
   sending, by the computer system responding to the agreed trajectory change being received by the computer system within the strategic time horizon, the trajectory change in the second format for the future portion of the trajectory for the aircraft to an aircraft computer system in the aircraft configured to change the future portion of the trajectory of the aircraft during flight of the aircraft.

2. The method of claim 1, further comprising the aircraft computer system in the aircraft:
   processing code only in the second format;
   using the trajectory change for updating a trajectory data managing the trajectory for the aircraft; and
   changing the trajectory data for the future portion of the trajectory of the aircraft.

3. The method of claim 2, further comprising:
   an arbitrator in the computer system transforming, responding to receiving the agreed trajectory change within the strategic time horizon, the agreed trajectory change from the first format into the trajectory change in the second format; and
   the strategic air traffic controller approving the agreed trajectory change while negotiating with the data processing device.

4. The method of claim 2, wherein the data processing device is selected from a group comprising an electronic flight bag, a mobile phone, a laptop computer, and a tablet computer.

5. The method of claim 2, wherein the data processing device is in a location selected from a group comprising the aircraft, a ground location, a ground vehicle, a ship, and another aircraft.

6. The method of claim 1 further comprising:
   coordinating, by the computer system, changes to the agreed trajectory change that do not require renegotiating the agreed trajectory change with a strategic air traffic controller.

7. The method of claim 1, wherein the aircraft computer system is selected from a group comprising a flight management system and a flight management computer.

8. The method of claim 2, wherein the data processing device communicates with the computer system and the strategic air traffic controller using System Wide Information Management (SWIM).

9. The method of claim 1, wherein the aircraft computer system communicates with the computer system and a tactical air traffic controller using Controller Pilot Datalink Communication (CPDLC).

10. The method of claim 1, wherein the aircraft is selected from a group comprising an airplane, a commercial airplane, a tilt-rotor aircraft, a tilt wing aircraft, a vertical takeoff and landing aircraft, an electrical vertical takeoff and landing vehicle, a personal air vehicle, a remotely piloted aircraft, and an unmanned air vehicle.

11. An arbitration system that comprises a computer system and an arbitrator located in the computer system, wherein the arbitrator is configured to:
   receive, from a strategic air traffic controller located separate from an aircraft, an agreed trajectory change coded in a first format for a future portion of a trajectory for the aircraft;
   determine whether the agreed trajectory change has been received in the computer system within a strategic time horizon;
   transform, responsive to reception of the agreed trajectory change in the computer system within the strategic time horizon, the agreed trajectory change into a trajectory change coded in a second format; and send, in response to the agreed trajectory change being received in the computer system within the strategic time horizon, the trajectory change for the future portion of the trajectory for the aircraft to an aircraft computer system in the aircraft configured to change the future portion of the trajectory of the aircraft during flight of the aircraft.

12. The arbitration system of claim 11, wherein the arbitrator is further configured to:
receive the agreed trajectory change for the future portion of the trajectory for the aircraft from a data processing device, wherein the agreed trajectory change is approved by a strategic air traffic controller.

13. The arbitration system of claim 12, wherein the agreed trajectory change is approved by the strategic air traffic controller in response to negotiations between the data processing device and the strategic air traffic controller.

14. The arbitration system of claim 12, wherein the data processing device is selected from a group comprising an electronic flight bag, a mobile phone, a laptop computer, and a tablet computer.

15. The arbitration system of claim 12, wherein the data processing device is in a location selected from a group comprising the aircraft, a ground location, a ground vehicle, a ship, and another aircraft.

16. The arbitration system of claim 11, wherein the arbitrator is configured to:
coordinate changes to the agreed trajectory change that do not require renegotiating the agreed trajectory change with a strategic air traffic controller.

17. The arbitration system of claim 11, wherein the aircraft computer system is selected from a group comprising a flight management system and a flight management computer.

18. The arbitration system of claim 12, wherein the data processing device communicates with the computer system and the strategic air traffic controller using System Wide Information Management (SWIM).

19. The arbitration system of claim 11, wherein the aircraft computer system communicates with computer system and a tactical air traffic controller using Controller Pilot Datalink Communication (CPDLC).

20. The arbitration system of claim 11, wherein the aircraft is selected from a group comprising an airplane, a commercial airplane, a tilt-rotor aircraft, a tilt wing aircraft, a vertical takeoff and landing aircraft, an electrical vertical takeoff and landing vehicle, a personal air vehicle, a remotely piloted aircraft, and an unmanned air vehicle.

21. A method for managing a trajectory of an aircraft, the method comprising:
receiving, by a computer system, a trajectory revision request from a data processing device coded in a first format, wherein the trajectory revision request is a request to change a future portion of the trajectory for the aircraft;
determining, by the computer system, whether the future portion of the trajectory is for a time greater than a time threshold for an aircraft computer system in the aircraft to change the future portion of the trajectory, wherein the aircraft computer system manages the trajectory for the aircraft;
transforming, by the computer system responding to the future portion of the trajectory being for a time greater than the time threshold for the aircraft computer system in the aircraft to change the future portion of the trajectory, the trajectory revision request into a trajectory change coded in a second format;
sending, by the computer system responding to the future portion of the trajectory being for the time greater than the time threshold, the trajectory change coded in the second format to the aircraft computer system in the aircraft;
changing, by the aircraft computer system in the aircraft, the future portion of the trajectory of the aircraft during flight of the aircraft; and
subsequently receiving, by the computer system, a response to the trajectory change from the aircraft computer system.

22. The method of claim 21, wherein the trajectory change for the future portion is an agreed trajectory change resulting from a negotiation between the data processing device and a strategic air traffic controller in an air traffic control system, wherein the strategic air traffic controller handles sectors outside of a current sector for the aircraft.

23. The method of claim 21, wherein the trajectory revision request includes an agreed trajectory change resulting from a negotiation between the data processing device and a strategic air traffic controller in an air traffic control system that handles sectors outside of a current sector for the aircraft.

24. The method of claim 21, wherein a response to the trajectory revision request is selected from a group comprising an acceptance indicating that the trajectory change has been processed to update the trajectory for the aircraft, a rejection indicating that the trajectory revision request has been rejected, and a proposed change to the trajectory change.

25. The method of claim 21, wherein the aircraft computer system communicates with a tactical air traffic controller using Controller Pilot Datalink Communication (CPDLC).

26. The method of claim 21 further comprising:
sending, by the computer system, the trajectory change to the future portion of the of the trajectory to an air traffic control system in response to the aircraft computer system indicating that the future portion of trajectory has been changed.

* * * * *